(12) United States Patent
Luong

(10) Patent No.: US 9,087,284 B2
(45) Date of Patent: Jul. 21, 2015

(54) METHOD AND APPARATUS FOR SECURE RADIO FREQUENCY IDENTIFICATION TAG

(75) Inventor: Francis Luong, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 674 days.

(21) Appl. No.: 13/183,265

(22) Filed: Jul. 14, 2011

(65) Prior Publication Data

US 2013/0015955 A1   Jan. 17, 2013

(51) Int. Cl.
G06Q 20/34       (2012.01)
G06K 19/073     (2006.01)
G07F 7/08         (2006.01)

(52) U.S. Cl.
CPC .... G06K 19/07345 (2013.01); G06K 19/07309 (2013.01); G06Q 20/352 (2013.01); G06Q 20/354 (2013.01); G07F 7/0813 (2013.01); G07F 7/0833 (2013.01)

(58) Field of Classification Search
CPC .......... G06Q 20/354; G06K 19/07309; G06K 19/07345

USPC ........ 340/10.1, 572.1, 572.3, 572.7; 235/380, 235/382; 726/26, 27
See application file for complete search history.

(56) References Cited

U.S. PATENT DOCUMENTS

| | | | | |
|---|---|---|---|---|
| 6,588,660 | B1 * | 7/2003 | Buescher et al. | 235/382 |
| 6,769,618 | B1 * | 8/2004 | Finkelstein | 235/487 |
| 2003/0201331 | A1 * | 10/2003 | Finkelstein | 235/487 |
| 2003/0226899 | A1 * | 12/2003 | Finkelstein | 235/492 |
| 2006/0085308 | A1 * | 4/2006 | Metzger | 705/34 |
| 2006/0100932 | A1 * | 5/2006 | Ohmori et al. | 705/21 |
| 2006/0289657 | A1 * | 12/2006 | Rosenberg | 235/492 |
| 2008/0256642 | A1 * | 10/2008 | Hachey | 726/27 |
| 2009/0065571 | A1 * | 3/2009 | Jain | 235/379 |
| 2009/0315670 | A1 * | 12/2009 | Naressi et al. | 340/5.8 |
| 2010/0140358 | A1 * | 6/2010 | Couck | 235/487 |

* cited by examiner

*Primary Examiner* — Andrew Bee

(57) ABSTRACT

An approach is provided for securing information stored on a radio frequency identification tag. An apparatus includes a radio frequency identification tag having a first state in which a carrier signal from a reader does not activate the radio frequency identification tag and a second state in which the carrier signal from a reader does activate the radio frequency identification tag to allow retrieval of information stored on the radio frequency identification tag by the reader.

15 Claims, 8 Drawing Sheets

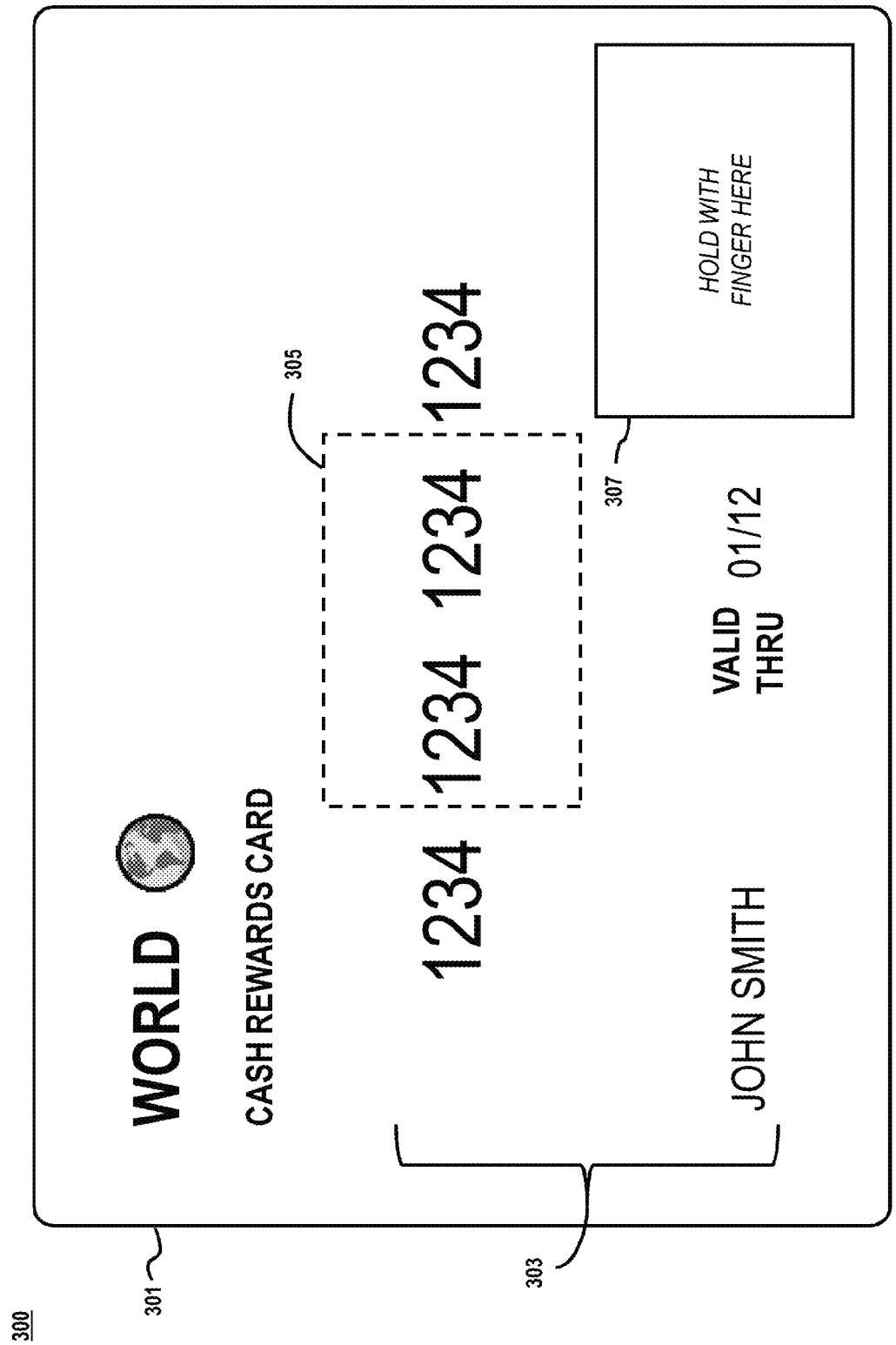

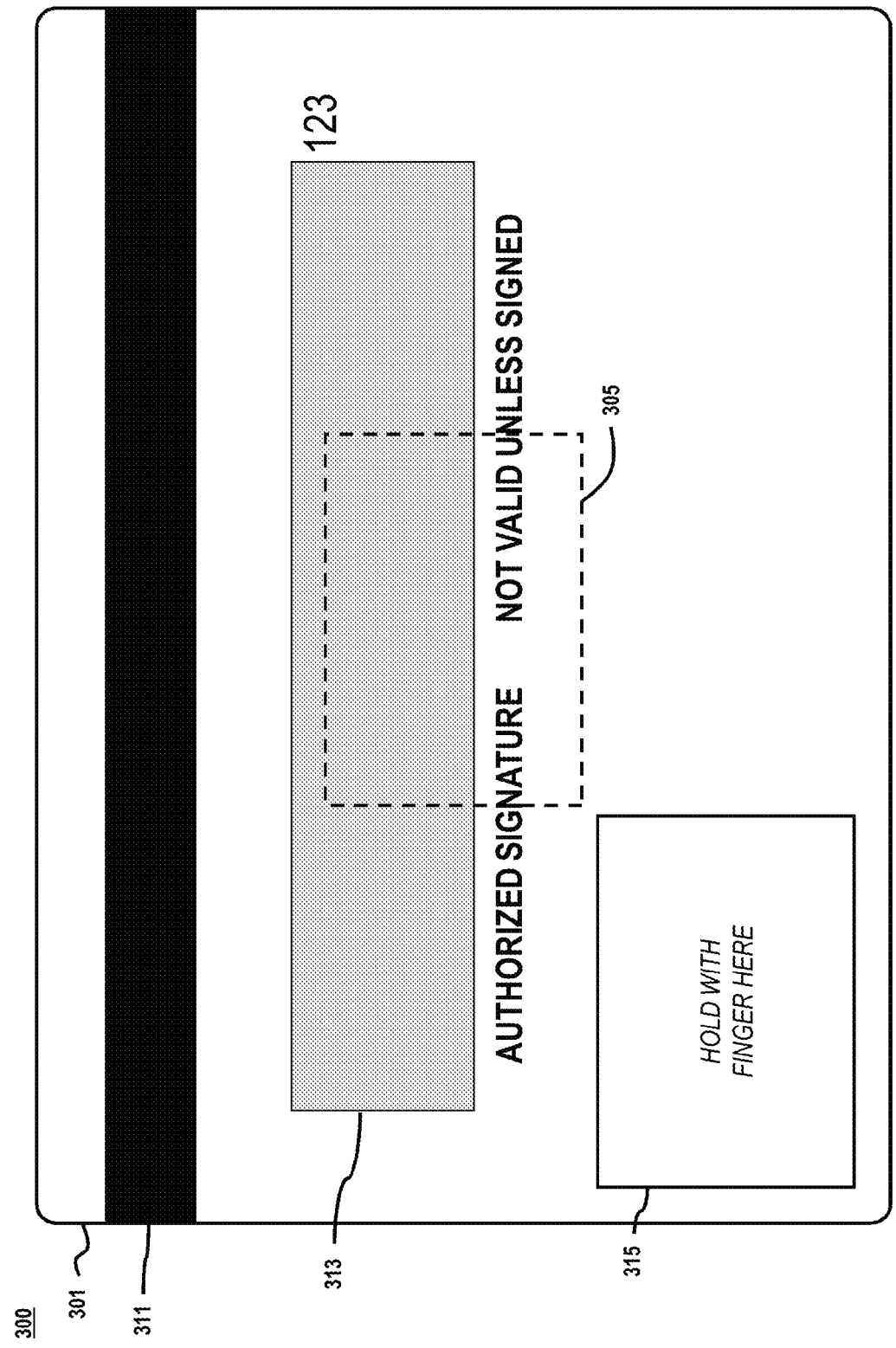

600

METHOD AND APPARATUS FOR SECURE RADIO FREQUENCY IDENTIFICATION TAG

BACKGROUND INFORMATION

Radio Frequency Identification (RFID) systems are used as a means to communicate information associated with an RFID tag using an RFID reader. For example, an RIFD tag can be affixed to or embedded within an object, such as a commercial product, and an RFID reader can be used to retrieve information from the RFID tag in order to determine various information about the product (e.g., manufacturing information, pricing information, etc., etc.). Traditionally, RFID tags can be read unencumbered by the tags themselves. Consequently, access to the data stored within the tags can be readily obtained by unauthorized readers.

Therefore, there is a need for an approach that effectively and efficiently prevents unauthorized retrieval of information from an RFID tag.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A and 3B are diagrams of an RFID tag device with an embedded RFID tag, according to an exemplary embodiment;

DESCRIPTION OF THE PREFERRED EMBODIMENT

A preferred method and apparatus for providing a secure Radio Frequency Identification (RFID) tag are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to an RFID device in the form of a card containing personal information, such as a financial services card or other service user identification card, it is contemplated that these embodiments have applicability to any device utilizing an RFID tag to communicate information.

Figure 1A:
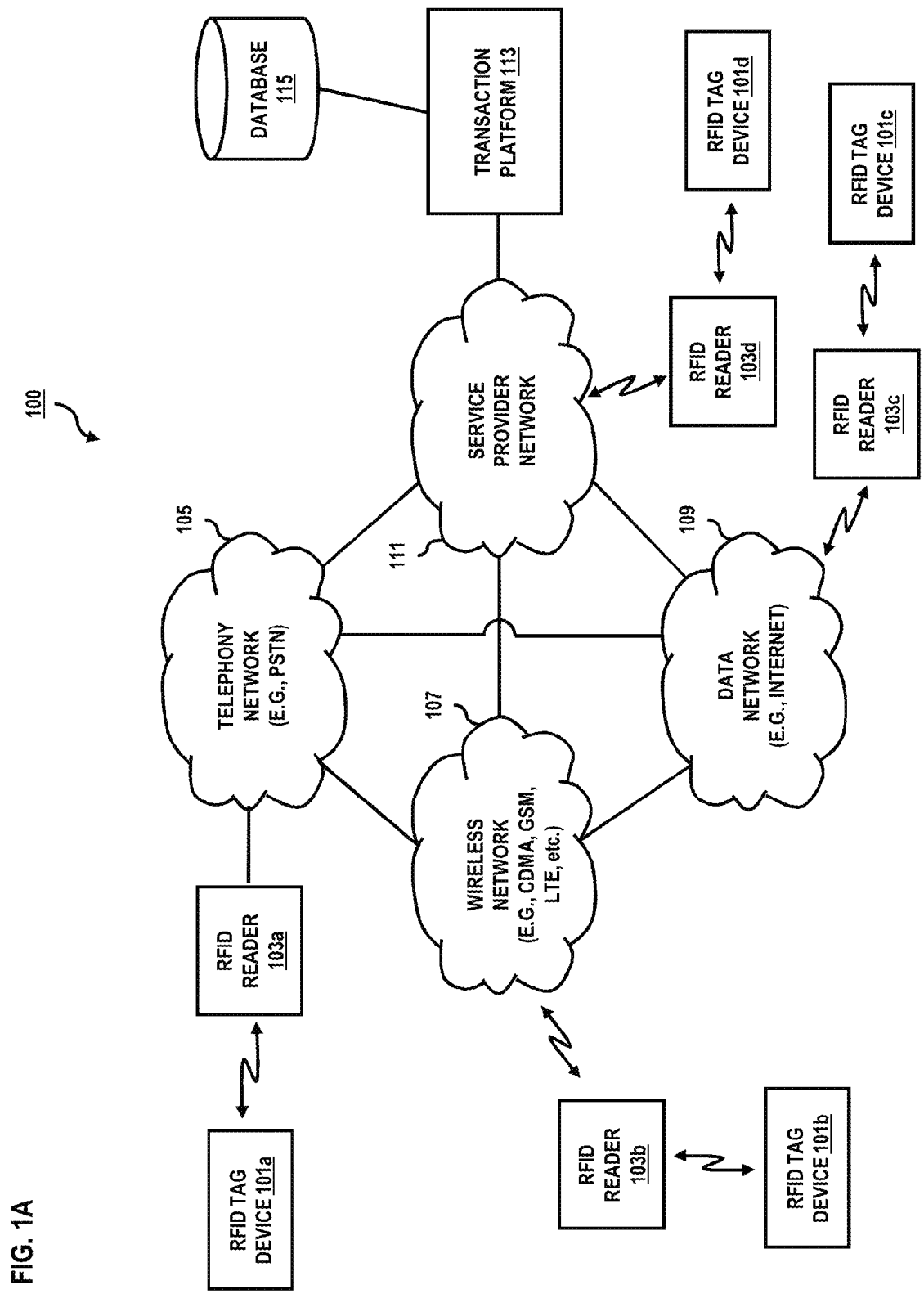
FIG. 1A is a diagram of a system for using Radio Frequency Identification (RFID) tags and RFID readers to share information with a service provider in order to utilize services of the service provider, according to an exemplary embodiment.

FIG. 1A is a diagram of a system for using RFID tags and RFID readers to share information with a service provider in order to utilize services of the service provider, according to an exemplary embodiment. RFID systems can be used in conjunction with services of service providers in a variety of manners and over a variety of networks. Thus, for example, an RFID reader can be used to retrieve information from an RFID tag embedded within a credit card, or other financial services card, during a purchase transaction, and then the RFID reader can communication such information to a financial service provider using a communication network, and the service provider can provide the merchant with verification of the authorization of the transaction using the credit card. Thus, in system 100 shown in FIG. 1A, according to an exemplary embodiment, RFID tag devices 101*a*, 101*b*, 101*c*, 101*d* are shown in communication with RFID readers 103*a*, 103*b*, 103*c*, 103*d* that are in communication (wired or wirelessly) with various networks that are used to communicate with a service provider.

As noted above, RFID systems are used as a means to communicate information associated with an RFID tag using an RFID reader. In certain instances, however, it may be desirable to prevent an RFID reader from activating an RFID tag in order to retrieve such information. For example, RFID tags are being incorporated into devices such as financial services cards (e.g., credit cards, debit cards, gift cards, etc.) as a way to store and communicate information with an RFID reader quickly and efficiently, for example, at a point of sale (POS). However, such RFID tags embedded within a card may be susceptible to unauthorized access by an RFID reader. For example, if such card is placed within a wallet or carried within a purse of a user, it may be possible for an unscrupulous individual that is in proximity to the user to use an RFID reader to activate the RFID tag and retrieve information store in the RFID tag unbeknownst to the user. Accordingly, the inventor has determined that there is a need for an approach that effectively and efficiently prevents unauthorized retrieval of information from an RFID tag in this and other instances.

In system 100, according to certain embodiments, one or more networks, such as telephony network 105, wireless network 107, data network 109, and/or service provider network 111, are provided to handle various communication sessions between the RFID reader and the service provider. Networks 105, 107, 109, and 111 may be any suitable wireline and/or wireless network. For example, telephony network 105 may include a circuit-switched network, such as the public switched telephone network (PSTN), an integrated services digital network (ISDN), a private branch exchange (PBX), or other like network.

Wireless network 107 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In one embodiment, the RFID reader 103*d* interacts with the service provider via the service provider network 111. The service provider network 111 may encompass terrestrial broadcasting networks, provider specific networks (e.g., a Verizon® FiOS® network, etc.), and the like. Further, the service provider can be an internet protocol television (IPTV) service provider, which offers subscribers various video services ranging from multi-channel video programming that mimics traditional broadcast television, to true video-on-demand (VOD) programming. In one embodiment, service provider network 111 integrates the television medium with that of the telecommunications, computing, and media environments, thereby broadening the scope of devices and sources available to individuals for obtaining media content using the RFID tag as a means for unlocking access to such services at a desired location. In this manner, users, via user equipment can receive media content accessible over the data network 109. For example, an RFID tag could be used to allow access to movies or other content from the service provider on a monitor located at an airport or on an airplane, etc. The user equipment can be any device capable of processing audio and/or video streams. Media content broadly includes any audio-visual content (e.g., broadcast television programs, VOD programs, pay-per-view programs, IPTV feeds, digital video disc (DVD) related content, etc.), pre-recorded media content, data communication services content (e.g., commercials, advertisements, videos, movies, songs, images, sounds, etc.), Internet services content (streamed audio, video, or pictographic media), and/or any other equivalent media form.

Although depicted as separate entities, networks 105, 107, 109, and 111 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that networks 105, 107, 109, and 111 may include components and facilities to provide for signaling and/or bearer communications between the various components or facilities of system 100. In this manner, networks 105, 107, 109, and 111 may embody or include portions of a signaling system 7 (SS7) network, or other suitable infrastructure to support control and signaling functions.

The service provider in FIG. 1A includes a transaction platform 113 and a database 115. The transaction platform 113 communicates with the RFID reader; and the transaction platform 113 can access the database 115 to retrieve information and/or verify/authenticate information from the RFID tag. The platform 113, in one embodiment, facilitates various transactions involving the use of RFID tags. Such transactions can include, for example, financial transactions, sales transactions, etc.

In system 100 of FIG. 1A, the RFID readers 103a, 103b, 103c, 103d can communicate with their respective network using any wired or wireless technology (e.g., BLUETOOTH®, WiFi, etc.). Additionally, note that each of the RFID tags 101a, 101b, 101c, 101d can be used in conjunction with any of the RFID readers 103a, 103b, 103c, 103d or any of the networks.

Figure 1B:
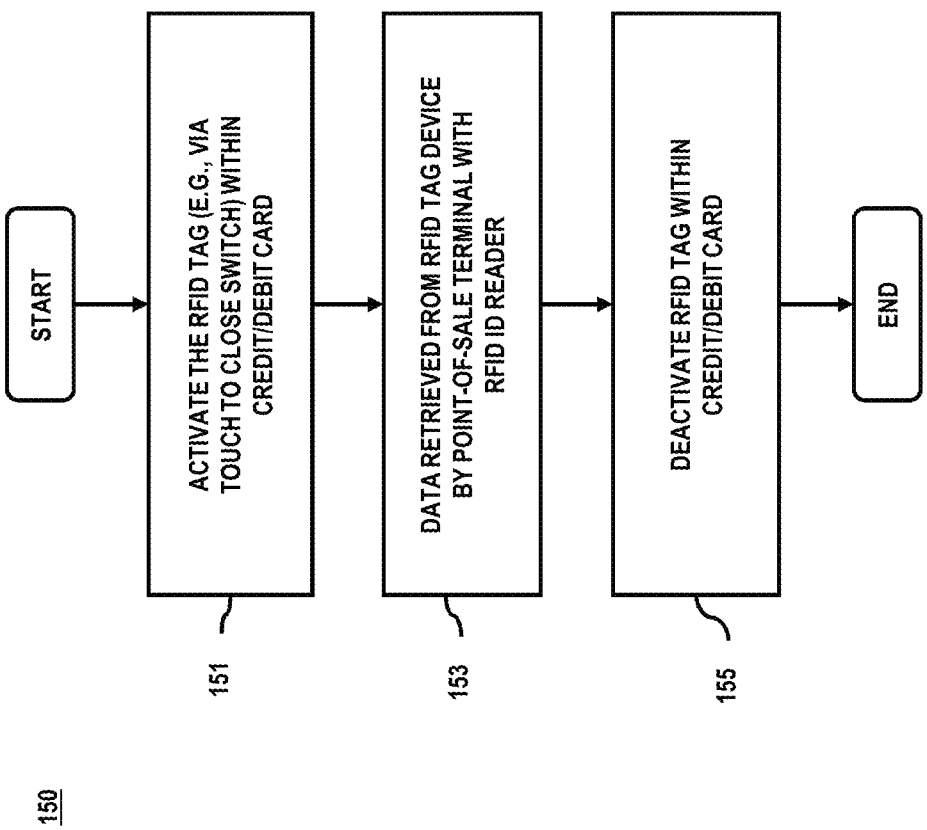
FIG. 1B is a flowchart of a process for preventing unauthorized access RFID tags, according to one embodiment.
Figure 2:
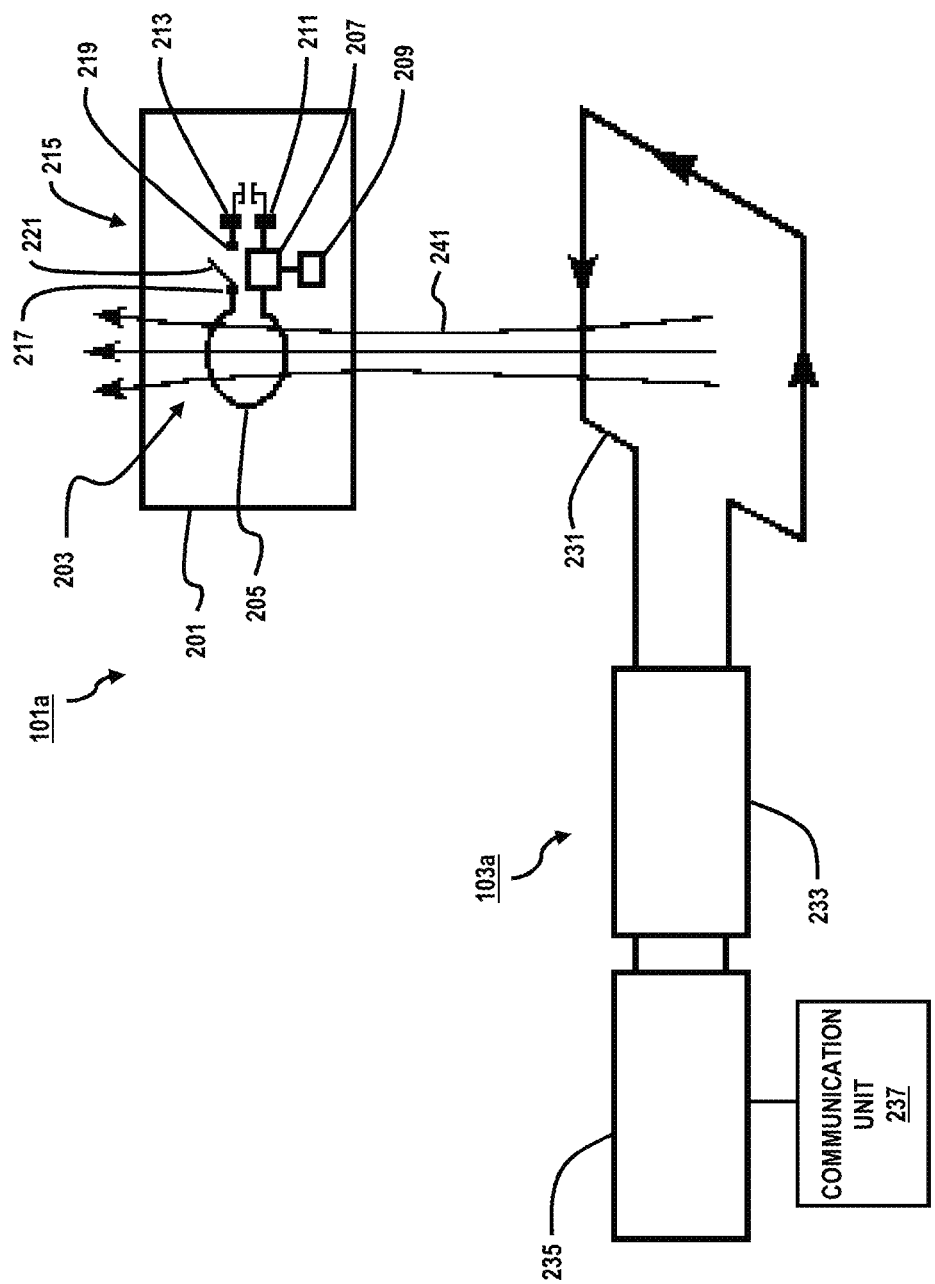
FIG. 2 is a diagram of an RFID tag device and an RFID reader configured to communicate with the RFID tag device, according to an exemplary embodiment.

FIG. 1B is a flowchart of a process for preventing unauthorized access RFID tags, according to one embodiment. By way of example, a user utilizes an RFID tag that is formed as part of a credit or debit card (e.g., RFID tag device 101a of FIG. 1A) to conduct financial transactions. RFID reader 103a can be part of a point-of-sale (POS) terminal to accept payment in a sales transaction, for instance. Process 150 involves the user first activating the RFID tag device 101a, per step 151. In one embodiment, such activation can be provided by the user's touch (e.g., finger) to trigger a switching mechanism (as shown in FIG. 2). Next, in step 153, the data on the RFID tag device 101a is retrieved by the RFID reader 103a; the data can include user account information to complete the sales transaction. Thereafter, the user can deactivate the card by appropriately switching back the circuitry to disable the RFID tag, per step 155.

The described process, in certain embodiments, advantageously provides a more secure approach (while retaining the convenience of near-field technology).

FIG. 2 is a diagram of an RFID tag device 101a and an RFID reader 103a configured to communicate with the RFID tag device 101a, according to an exemplary embodiment. The RFID tag device 101a depicted in FIG. 2 is a card 201 with an RFID tag 203 embedded therein. Although this embodiment is described with respect to an RFID device in the form of a card containing personal information, such as a financial services card or other service user identification card, it is contemplated that these embodiments have applicability to any device utilizing an RFID tag to communicate information.

RFID systems generally include an RFID reader, a passive RFID tag, and a host computer. The RFID tag includes an antenna coil (also referred to herein as a "tag coil"), an integrated circuit that includes basic modulation circuitry, and non-volatile memory. The RFID tag is energized by a time-varying electromagnetic radio frequency (RF) wave signal (or carrier signal) transmitted by the RFID reader. The RF field passing through the antenna coil can generate a voltage across the coil, which can be rectified to supply power to the RFID tag. Once voltage is generated, information stored in the memory of the RFID tag is transmitted back to the RFID reader, which is sometimes called backscattering. The information stored in the RFID tag can be fully identified by detecting the backscattering using the RFID reader.

Faraday's law states that a time-varying magnetic field through a surface bounded by a closed path induces a voltage around the loop. Thus, passive RFID tags utilize an induced antenna coil voltage for operation. This induced AC voltage is rectified to provide a voltage source for the RFID tag. As the DC voltage reaches a certain level, the RFID tag starts operating. By providing an energizing RF signal, a reader can communicate with a remotely located device that has no external power source such as a battery. Since the energizing and communication between the reader and tag is accomplished through antenna coils, it is important that the device must be equipped with a proper antenna circuit for successful RFID applications.

In order to provide security and ensure that an RFID reader cannot be used to extract information stored on the RFID tag in an unauthorized manner, an embodiment is provided of an apparatus that includes an RFID tag having a first state in which a carrier signal from a reader does not activate the RFID tag and a second state in which the carrier signal from a reader does activate the RFID tag to allow retrieval of information stored on the RFID tag by the reader. In an exemplary embodiment, an apparatus is provided that includes an RFID tag having a switch structure configured to require user activation of the switch structure in order to allow a carrier signal from a reader to activate the RFID tag to allow retrieval of information stored on the RFID tag by the reader.

FIG. 2 depicts an exemplary embodiment of an RFID tag device 101a that includes a device body 201, which in this exemplary embodiment is a card, such as a plastic card, with an RFID tag 203 embedded within the device body 201. The RFID tag 203 includes an antenna coil (or tag coil) 205, an integrated circuit 207 that includes basic modulation circuitry, and non-volatile memory 209 configured to store information. The RFID tag 203 includes a circuit with a first lead 211 and a second lead 213, across which a voltage can be generated in accordance with Faraday's law if a switch structure 215 is in a closed state, such that the circuit loop is completed. Thus, the RFID tag 203 further includes a switch structure 215 that includes a first terminal 217 and a second terminal 219, and a conduit 221, which can either be a structure of the RFID tag itself or can be an external conduit such as a hand, as will be described further below. The conduit 221 can be in an open state (as depicted) in which the conduit 221 does not electrically connect the first terminal 217 and the second terminal 219, or in a closed state in which the conduit electrically connects the first terminal 217 and the second terminal 219.

FIG. 2 also depicts an exemplary embodiment of an RFID reader 103a that includes an antenna coil (or reader coil) 231, tuning circuitry 233, a processor 235, and a communication unit 237 configured to communicate with the service provider via one or more network(s). Thus, the RFID reader 103a can energize the RFID tag 203 by generating a time-varying electromagnetic radio frequency (RF) wave signal (or carrier signal) 241 if the switch structure 215 of the RFID tag 203 is in the closed state, and if the RFID tag 203 and the RFID reader 103a are in proximity to one another. Once voltage is generated and the RFID tag 203 activated, information stored in the memory 209 of the RFID tag 203 can be read by the RFID reader 103a. However, if the switch structure is in an open state, then a carrier signal 241 from the RFID reader 103a will not be able to generate a voltage in the RFID tag 203 and information stored in the memory 209 of the RFID tag 203 cannot be read by the RFID reader 103a.

In order to provide security and ensure that an RFID reader cannot be used to extract information stored on the RFID tag 203 in an unauthorized manner, an embodiment is provided of an apparatus that includes an RFID tag having a first state in which a carrier signal 241 from a reader 103a does not activate the RFID tag 203 and a second state in which the carrier signal 241 from a reader 103a does activate the RFID tag 203 to allow retrieval of information stored on the RFID tag 203 by the reader 103a. Thus, in the embodiment in FIG. 2, an apparatus is provided that includes an RFID tag 203 having a switch structure 215 configured to require user activation of the switch structure 215 in order to allow the carrier signal 241 from the RFID reader 103a to activate the RFID tag 203 to allow retrieval of information stored on the RFID tag 203 by the reader 103a.

The switch structure 215 can be configured in many different manners. In an exemplary embodiment, the switch structure 215 can be provided such that the first terminal 217 includes a first contact portion configured to conductively receive a first finger of a user and the second terminal 219 includes a second contact portion configured to conductively receive a second finger of the user in order to utilize the user's hand as conduit 221 to close the switch structure 215 and actuate the closed state. Such an embodiment can be used to provide a RFID tag that is a solid state device. Also, such an embodiment can be used to provide an apparatus including such an RFID tag that is a solid state device. Thus, for example, such a solid state configuration may be advantageous for use as a card, such as a financial services card, which may be frequency used and frequency slipped into and out from a sleeve in a wallet, and therefore would not be conducive to moving components, which might be accidentally actuated or might be broken. However, alternative embodiment are contemplated with a conduit 221 that is incorporated into the RFID tag 203 as a component thereof that can be mechanically or electrically actuated (e.g., by sliding/moving/pressing a switch, actuating a sensor, etc.) in order to closed the circuit of the RFID tag 203. As mentioned, the mechanical or electrical actuation can be triggered through a physical touch of the hand of the user, according to certain embodiments.

FIGS. 3A and 3B are diagrams of an RFID tag device 300 with an embedded RFID tag, according to an exemplary embodiment. This exemplary embodiment includes a financial services card 301, such as a credit card, that contains certain information 303 printed on a first side of the card. The RFID tag device 300 has an RFID tag 305 embedded within the body of the card 301. It should be noted that the information 303 could be stored on the RFID tag 305, rather than (or in addition to) being printed on side of the card 301, in order to better secure such information.

The RFID tag device 300 further includes a first contact portion 307 on the front side of the card 301. The first contact portion 307 is made of an electrically conductive material and is configured to conductively receive a first finger of a user. The first contact portion 307 is electrically connected to a terminal (e.g., first terminal 217 in FIG. 2) of the switch structure of the RFID tag 305. The first contact portion 307 can also be provided with instructional indicia printed thereon in order to aid the use of the RFID tag device 300, such as "HOLD WITH FINGER HERE" as shown in FIG. 3A.

FIG. 3B shows an opposite rear second side of the financial services card 301 of FIG. 3A. The second side of the card 301 may include a magnetic strip 311 that can be used to store information, and may include an authorized signature area 313. It should be noted that the magnetic strip could be eliminated, and any information previously stored thereon could instead be stored on the RFID tag 305 in order to better secure such information.

The RFID tag device 300 further includes a second contact portion 315 on the rear side of the card 301. The second contact portion 315 is made of an electrically conductive material and is configured to conductively receive a second finger of a user. The second contact portion 315 is electrically connected to a terminal (e.g., second terminal 219 in FIG. 2) of the switch structure of the RFID tag 305. The second contact portion 315 can also be provided with instructional indicia printed thereon in order to aid the use of the RFID tag device 300, such as "HOLD WITH FINGER HERE" as shown in FIG. 3A.

Using the exemplary embodiment shown in FIGS. 3A and 3B, a user can grasp the card 301 in a manner such that a thumb and forefinger are respectively on the first contact portion 307 and the second contact portion 315. Thus, the user's hand can act as a conduit (e.g., as conduit 221 in FIG. 2) to close the switch structure and actuate the closed state of the RFID tag device 300, thereby allowing a carrier signal to activate the RFID tag 305 and allowing an RFID reader to retrieve the information stored thereon. Therefore, when the card 301 is not held in a manner that closes the switch structure, for example, when the card 301 is stored in a user's wallet, or when the user's thumb and fingers are not on the contact portions 307, 315, then the RFID tag device 300 is in a non-active, open and secure state in which a carrier signal cannot activate the RFID tag 305 and an RFID reader cannot retrieve the information stored thereon.

Figure 4:
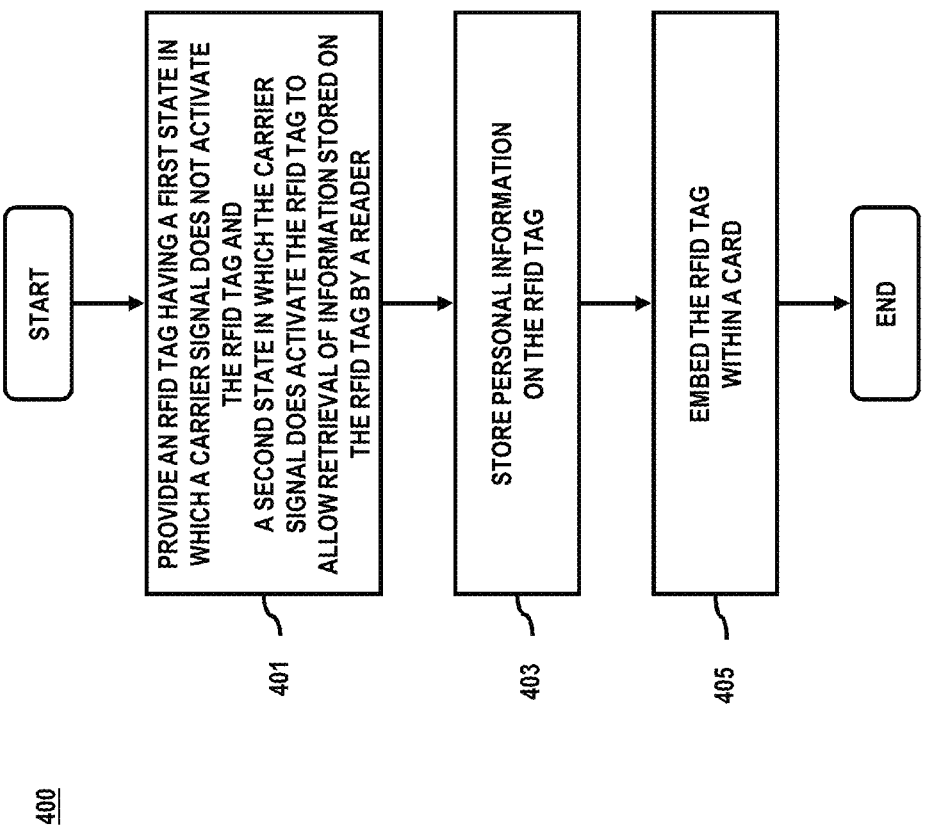
FIG. 4 is a flowchart of a process for securing information stored on a radio frequency identification tag, according to one embodiment.

FIG. 4 is a flowchart of a process 400 for securing information stored on a radio frequency identification tag, according to one embodiment. Process 400 includes providing a radio frequency identification tag having a first state in which a carrier signal from a reader does not activate the radio frequency identification tag and a second state in which the carrier signal from a reader does activate the radio frequency identification tag to allow retrieval of information stored on the radio frequency identification tag by the reader (step 401). Personal information is stored, per step 403, on the RFID tag. In step 405, the RFID tag is embedded within a card or other suitable form factors.

The processes described herein for providing secure radio frequency identification tag may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
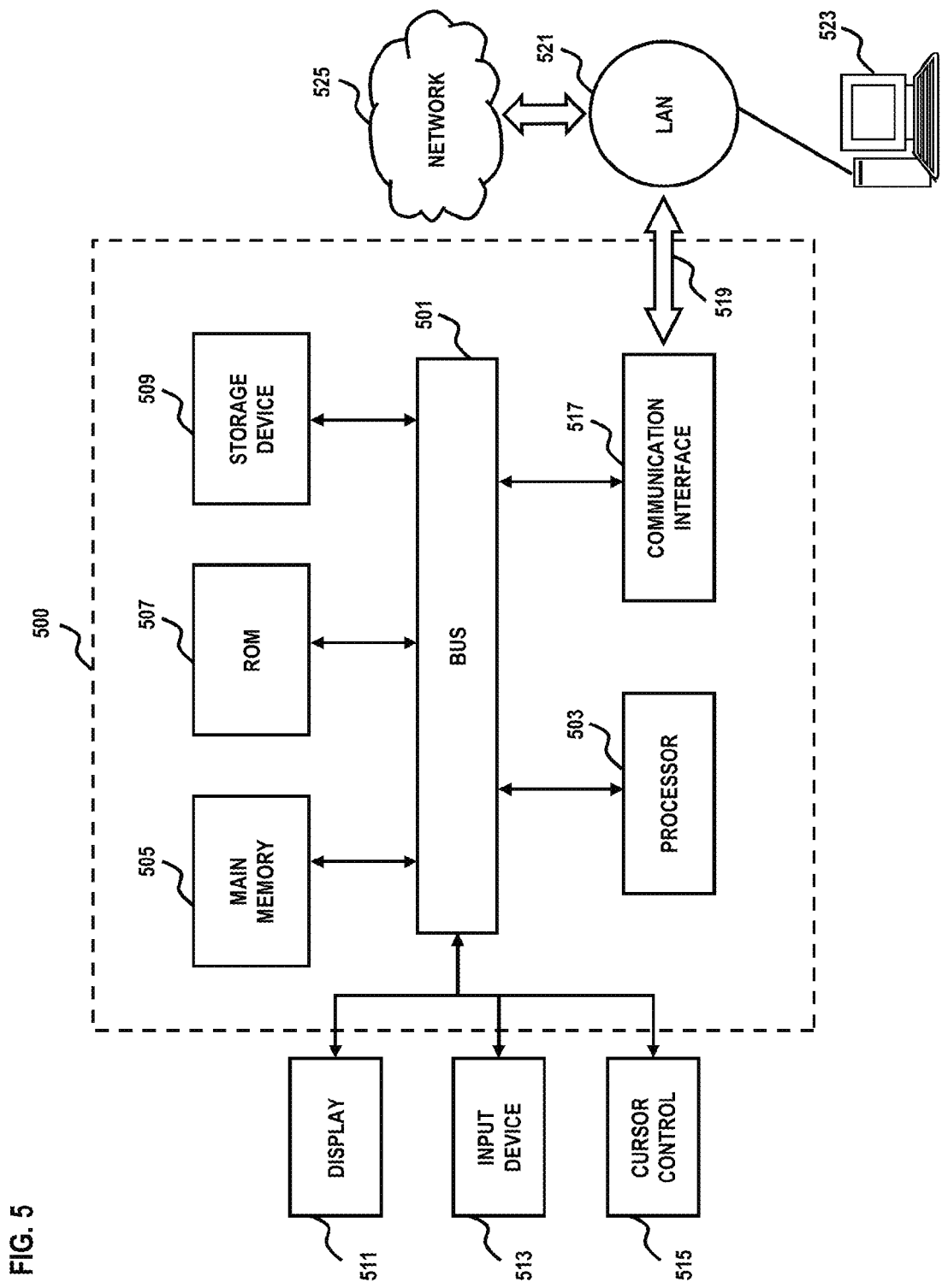
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
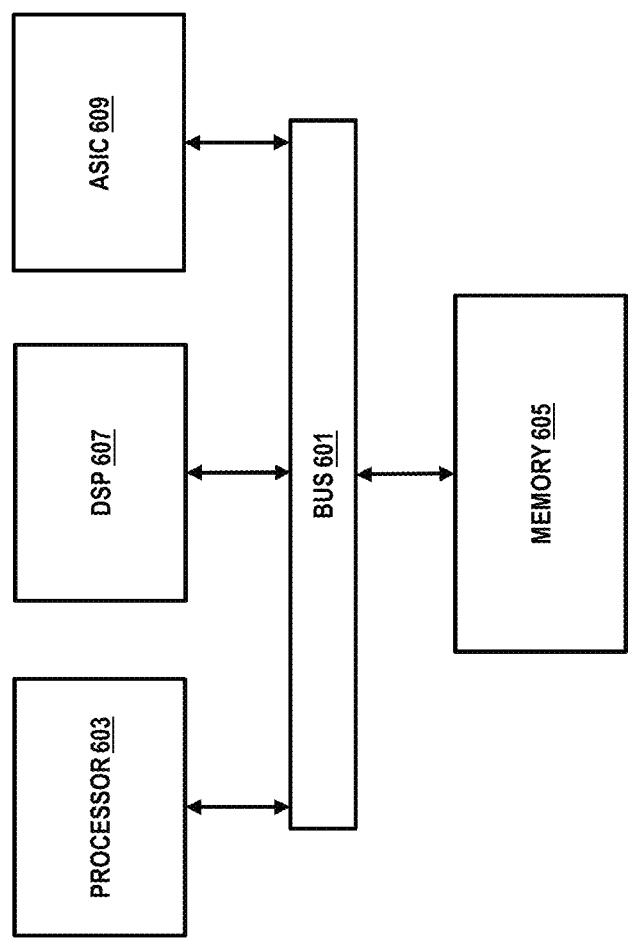
FIG. 6 is a diagram of a chip set that can be used to implement various exemplary embodiments.

FIG. 6 illustrates a chip set or chip 600 upon which an embodiment of the invention may be implemented. Chip set 600 is programmed to enable advertisers to correlate a communication session with the amount of consumption of the advertisement by a viewer as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of placing and processing emergency packetized voice calls.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable advertisers to correlate a communication session with the amount of consumption of the advertisement by a viewer. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. An apparatus comprising:
a services card embedded with a radio frequency identification tag that has a first state in which a carrier signal from a reader does not activate the radio frequency identification tag and a second state in which the carrier signal from a reader activates the radio frequency identification tag to allow retrieval of information stored on the radio frequency identification tag by the reader,
wherein the radio frequency identification tag includes a switch structure,
wherein the radio frequency identification tag stores personal identification and financial information of a user, as well as service information of a service provider,
wherein when the user contacts the card to set the radio frequency identification tag in the second state, the radio frequency identification tag allows the user to access media content of the service provider at a device of a third party that is independent from the user and the service provider.

2. The apparatus according to claim 1, wherein the switch structure is configured to be activated by a hand of the user to change the radio frequency identification tag from the first state to the second state.

3. The apparatus according to claim 1, wherein the switch structure includes a first terminal and a second terminal, wherein the first terminal includes a first contact portion configured to conductively receive a first finger of the user and the second terminal includes a second contact portion configured to conductively receive a second finger of the user in order to utilize a hand of the user as a conduit to close the switch structure and actuate the second state.

4. The apparatus according to claim 1, wherein the device is located in a commercial establishment, the services card is a service user identification card, and
the card has a first terminal on a first side of the card and a second terminal on a second side of the card opposite to the first side of the card, and wherein the first terminal includes a first contact portion configured to conductively receive a first finger of the user and the second terminal includes a second contact portion configured to conductively receive a second finger of the user in order to utilize a hand of the user as a conduit to actuate the second state.

5. The apparatus according to claim 4, wherein the device is a monitor, the service provider is an internet protocol television service provider, and the commercial establishment is an airport, an airplane, or a combination thereof.

6. The apparatus according to claim 1, wherein the radio frequency identification tag is a solid state device, and the media content includes broadcast media content, on demand media content, pay-per-view media content, media content feeds, data communication services content, web services content, or a combination thereof.

7. The apparatus according to claim 1, wherein the apparatus is a solid state device, and the switch structure includes a conduit to be mechanically or electrically actuated through a physical touch by a hand of the user without using the hand as a conduit.

8. The apparatus according to claim 1, wherein the radio frequency identification tag includes an antenna coil, an integrated circuit, and a memory, and wherein, in the second state, the carrier signal generates a voltage across the antenna coil and the integrated circuit retrieves the information from the memory to allow retrieval of information stored on the radio frequency identification tag by the reader.

9. A system comprising:
a reader; and
a services card embedded with a radio frequency identification tag having a switch structure configured to require user activation of the switch structure in order to allow a carrier signal from the reader to activate the radio frequency identification tag to allow retrieval of personal identification and financial information of a user as well as service information of a service provider stored on the radio frequency identification tag by the reader,
wherein the reader sends the retrieved information to the service provider over a communication network and the service provider returns a verification of a service authorization using the services card, and
wherein when the user contacts the services card to set the radio frequency identification tag in an activated state, the radio frequency identification tag allows the user to access media content of the service provider at a device of a third party that is independent from the user and the service provider.

10. The system according to claim 9, wherein the switch structure includes a first terminal and a second terminal, wherein the first terminal includes a first contact portion configured to conductively receive a first finger of a user and the second terminal includes a second contact portion configured to conductively receive a second finger of the user in order to utilize a hand of the user as a conduit to close the switch structure and activate the radio frequency identification tag.

11. The system according to claim 9, wherein the card has a first terminal on a first side of the card and a second terminal on a second side of the card opposite to the first side of the card, and wherein the first terminal includes a first contact portion configured to conductively receive a first finger of a user and the second terminal includes a second contact portion configured to conductively receive a second finger of the user in order to utilize a hand of the user as a conduit to close the switch structure and activate the radio frequency identification tag.

12. The system according to claim 9, wherein the radio frequency identification tag is a solid state device.

13. The system according to claim 9, wherein the service card includes a solid state device.

14. A method comprising:
providing a services card embedded with a radio frequency identification tag that has a first state in which a carrier signal from a reader does not activate the radio frequency identification tag and a second state in which the carrier signal from a reader activates the radio frequency identification tag to allow retrieval of information stored on the radio frequency identification tag by the reader; and
storing personal identification and financial information of a user, as well as service information associated with a service provider, on the radio frequency identification tag,
wherein when the user contacts the card to set the radio frequency identification tag in the second state, the radio frequency identification tag allows the user to access media content of the service provider at a device of a third party that is independent from the user and the service provider.

15. The method according to claim 14, wherein the card has a first terminal on a first side of the card and a second terminal on a second side of the card opposite to the first side of the card, and wherein the first terminal includes a first contact portion configured to conductively receive a first finger of a user and the second terminal includes a second contact portion configured to conductively receive a second finger of the user in order to utilize a hand of the user as a conduit to close a switch structure and activate the radio frequency identification tag.

* * * * *